United States Patent
Ostuni et al.

(10) Patent No.: US 9,463,983 B2
(45) Date of Patent: Oct. 11, 2016

(54) METHOD FOR LOAD REGULATION OF AN AMMONIA PLANT

(71) Applicant: Ammonia Casale SA, Lugano-Besso (CH)

(72) Inventors: Raffaele Ostuni, Milan (IT); Federico Zardi, Breganzona (CH)

(73) Assignee: Casale SA (CH)

( * ) Notice: Subject to any disclaimer, the term of this patent is extended or adjusted under 35 U.S.C. 154(b) by 16 days.

(21) Appl. No.: 13/626,316

(22) Filed: Sep. 25, 2012

(65) Prior Publication Data

US 2013/0108538 A1    May 2, 2013

(30) Foreign Application Priority Data

Nov. 2, 2011   (EP) .................................... 11187431

(51) Int. Cl.
*C01C 1/04* (2006.01)
*C01B 3/02* (2006.01)

(52) U.S. Cl.
CPC ............. *C01C 1/0482* (2013.01); *C01B 3/025* (2013.01); *C01C 1/0476* (2013.01); *C01B 2203/02* (2013.01); *C01B 2203/068* (2013.01); *C01B 2203/1685* (2013.01); *Y02E 60/366* (2013.01); *Y02P 20/133* (2015.11)

(58) Field of Classification Search
CPC ..... C01C 1/04; C01C 1/0458; C01C 1/0476; C01C 1/0482; C01B 2203/1628–2203/169; Y02E 60/364–60/368
See application file for complete search history.

(56) References Cited

U.S. PATENT DOCUMENTS

| | | | |
|---|---|---|---|
| 2,881,053 A * | 4/1959 | Bowers .......................... | 423/362 |
| 4,107,277 A | 8/1978 | da Rosa | |
| 4,180,858 A | 12/1979 | Gaines et al. | |
| 4,305,918 A | 12/1981 | Gaines | |
| 4,383,982 A | 5/1983 | Pinto | |
| 2005/0025692 A1 | 2/2005 | Becher et al. | |

OTHER PUBLICATIONS

Grundt et al., "Hydrogen by Water Electrolysis as Basis for Small Scale Ammonia Production. A Comparison with Hydrocarbon Based Technologies", International Journal of Hydrogen Energy, vol. 7, No. 3, 1982, pp. 247-257.
European Search Report issued in connection with EP 11 18 7431.

\* cited by examiner

*Primary Examiner* — Anthony J Zimmer
(74) *Attorney, Agent, or Firm* — Akerman LLP

(57) ABSTRACT

A method for regulation of an ammonia plant where a purge gas (10) containing inerts is extracted from ammonia synthesis loop (SL), and where the ammonia plant is operated at a partial load by keeping the ammonia synthesis loop at a nominal high pressure, and reducing the purge rate in order to increase concentration of inerts in the ammonia synthesis loop and avoid overheating of the ammonia reactor; preferably a water electrolysis section (WE) produces a hydrogen feed (3) and an air separator produces a nitrogen feed (4); hydrogen and nitrogen are mixed to form a make up gas (5) which is reacted at a high-pressure in said ammonia synthesis loop (SL).

9 Claims, 1 Drawing Sheet

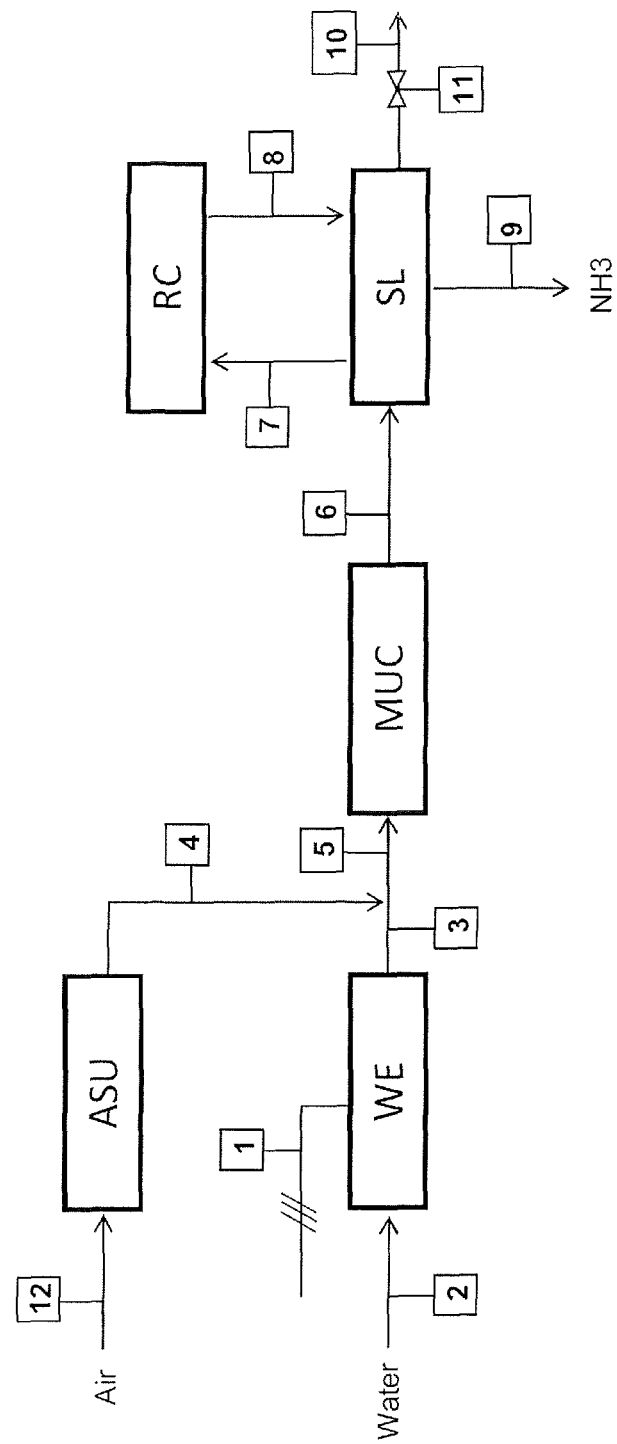

METHOD FOR LOAD REGULATION OF AN AMMONIA PLANT

CROSS-REFERENCE TO RELATED APPLICATIONS

This application claims priority to European Patent Application No. 11187431.9, filed Nov. 2, 2011, the entire content of which is incorporated herein by reference.

FIELD OF THE INVENTION

The present invention relates to production of ammonia. The invention relates to a method for regulation of an ammonia plant. The invention also relates to a process and plant which implement the method for a flexible production of ammonia.

PRIOR ART

Synthesis of ammonia starting from hydrogen and nitrogen is known. According to the known art, a make-up gas comprising hydrogen and nitrogen is catalytically converted to ammonia in a high-pressure (HP) synthesis loop, usually at a pressure around 80-300 bar. This make-up syngas is produced in a front-end section, where hydrogen is produced by steam reforming of a hydrocarbon source. The hydrocarbon source is natural gas or a synthesis gas produced by partial oxidation of another carbon source, e.g. gasification of coal. The nitrogen source is usually air; in some embodiments nitrogen is delivered by an air separation unit (ASU).

A known set-up for example includes the following steps. A desulphurized hydrocarbon feed is reformed with steam in a primary reformer, obtaining a first gas product containing CO, $CO_2$ and $H_2$ at a temperature around 800° C.; said first gas product is reacted with air, enriched air or oxygen in a secondary reformer or auto-thermal reformer (ATR), obtaining a second gas product at around 1000° C.; said second gas product is treated to remove impurities in a section including a shift converter, a $CO_2$-removal unit and a methanator. The so obtained make-up syngas is fed to the HP synthesis loop via a main compression section, usually comprising a multi-stage compressor.

In use, a purge stream is continuously drawn from the HP loop, to remove inerts that would otherwise accumulate in the reactor and affect the overall efficiency. The term inerts is used to denote gases which are inevitably contained in the make-up syngas but inert to the catalytic reaction of conversion, for example Argon. The purge gas stream contains also some hydrogen that can be separated and recycled to the loop. The purge rate is regulated in order to maintain a low concentration of said inerts in the overall loop circuit, typically less than 10% molar.

A conventional ammonia production process according to the above is disclosed for example in U.S. Pat. No. 4,383,982.

The above process, using steam reforming of a hydrocarbon as the hydrogen source, is well suited for large ammonia plants. A large ammonia pant is usually planned to operate continuously, and price and availability of the hydrocarbon source are generally stable and do not experience significant changes in the short term. This means that the hydrogen feed of a large, steam-reforming based ammonia plant is relatively stable, and the plant operates constantly at full capacity or near full capacity.

There is however a growing interest to a more flexible production of ammonia, especially on a smaller scale. A flexible production of ammonia is desirable, in particular, where the hydrogen source is the electrolysis of water. Electrolysis-based ammonia is particularly attractive for small-scale and distributed ammonia production. Small-scale ammonia production is emerging for many applications including: production of fertilizers at remote locations; on-site production of ammonium hydroxide (known as ammonia solution or aqua-ammonia) for example directly in a power plant or waste incinerator; distributed production of ammonia for use as a fuel.

Using electrolysis of water to produce hydrogen means that electric energy is the ultimate source of hydrogen. Availability and/or price of electric energy is typically subject to short-term fluctuations, on a daily or hourly basis, which means that a more flexible ammonia plant is desirable to follow the fluctuation of the availability and/or cost of the energy and, then, of the hydrogen feed. It could be desirable for example to produce ammonia when the cost of the energy is lower, and reduce the capacity of the ammonia plant to a minimum, when the cost of energy is higher. This is even more true when the electric energy is produced with a renewable source, such as solar or wind.

The ammonia synthesis reactor, however, cannot operate at the nominal elevated pressure (100-500 bar) when make-up gas feed falls below a minimum flow rate. Catalyst would be in excess over the make-up gas, and the temperature of the reaction would increase in a dangerous manner. The minimum flow rate to keep the reactor safe is usually at least 50% of the nominal flow rate. Overheating can be prevented by reducing the pressure of the synthesis loop when operating at partial load, in order to slow down the chemical reaction. But this would introduce another drawback, because the reactor vessel would suffer fatigue stress due to frequent pressurization and depressurization. Another problem is that the operation of the synthesis loop at a partial load is much less efficient compared to operation at full capacity and, as a consequence, the specific consumption is much higher.

These drawback are of a minor importance in large ammonia plants, which are in any case unable to operate below a 50%-60% of nominal capacity, due to minimum turn down of the front end and because there would be no incentive to run such a large plant at a low partial load. The same drawbacks however are an obstacle to the implementation of small-scale ammonia production based on electrolysis of water instead of steam reforming, where it could be necessary or desirable to turn down the ammonia production to a low partial load, well below 50%. As stated above, regulation of the synthesis pressure is not a satisfactory solution for the risk of a fatigue failure of the reactor; another solution could be given by providing several ammonia production lines in parallel, each line having its own make-up gas compressor and high-pressure loop, but this would increase the capital cost and is generally not acceptable. Hence the prior art does not provide a solution to the above problem.

Adaptation of the synthesis loop at low partial loads is desirable as well with a front-end of a different nature, e.g. autothermal reformer (ATR), partial oxidation (PDX) or a small-scale reformer (mini-reformer), i.e. in all those cases where it would be convenient to operate the loop well below its nominal capacity. In such a case the same problems above (risk of reactor overheating, low efficiency, fatigue stress if pressure is reduced) are encountered.

SUMMARY OF THE INVENTION

The aim of the invention is to overcome the above problem by providing a flexible ammonia process. One of the aims of the invention is to provide an ammonia process whose output can be regulated to follow short-term variations of cost and/or availability of a source feed, in particular of hydrogen produced by electrolysis of water.

The basic idea of the invention is to operate the ammonia synthesis loop at the nominal synthesis pressure, even at a partial load, while compensating for the lower gas feed by increasing the concentration of argon and other inerts in the synthesis loop, and particularly in the reactor. Said inerts will dilute the reagent and product gas in the reactor, thus protecting the reactor from overheating.

Hence the invention provides a method for regulation of an ammonia plant, said ammonia plant comprising a high-pressure ammonia synthesis loop comprising at least an ammonia reactor, where a make-up gas comprising a hydrogen feed and a nitrogen feed is converted into ammonia at a synthesis pressure; said loop also comprising a purge line arranged to draw a flow of a purge gas containing inerts from said loop, said method being characterized in that:

during operation of the ammonia plant at a partial load, the ammonia synthesis loop is operated at said synthesis pressure, and said purge flow is reduced obtaining a concentration of inerts in the ammonia synthesis loop which is greater than concentration of inerts in the loop at nominal load.

The partial load is understood as a condition where the ammonia output (kg/s or tons per hour) is less than a nominal capacity. The partial load is denoted with indication of the actual ammonia output as a percentage of the nominal capacity.

Preferably, the method includes the step of regulating the purge flow rate in order to keep a substantially constant temperature in the ammonia reactor. In some embodiments, the purge flow rate is regulated as a function of the temperature in a selected point of the loop, e.g. inside the ammonia reactor. The above method can be carried out by regulating the opening angle of a purge flow controlling valve. Said valve can be installed on the purge line.

The amount of purge gas extracted from the loop can be determined as a fraction of the make-up gas. At a nominal load, the molar flow rate of the purge gas is typically a few percent of the molar flow rate of make-up gas. The ratio between the flow rate of said purge gas and the flow rate of make-up gas is less than nominal, when the ammonia plant is operated at a partial load.

According to a preferred embodiment, said ratio is adjustable until it reaches 50% or less of the nominal value, when the ammonia plant is operated at a minimum load. More preferably, said ratio is adjustable until a value which is two to four times smaller than the nominal one. The minimum load is preferably less than 20% and may reach around 10% in some embodiments.

In some embodiments of the invention, the purge rate can be reduced until the concentration (in volume) of inerts in the synthesis loop reaches 40-70% and preferably around 50%, which is around 5 times the normal concentration.

The minimum achievable load may vary but in some embodiments of the invention, as stated above, the minimum load achieves 10%-20%, i.e. ammonia output equal to 10%-20% of nominal capacity. Preferably the above values of concentration of inerts (40 to 70%) are adopted when the ammonia plant runs at low partial loads such as 10 to 20%. In some embodiments, the amount of inerts accumulated in the loop is substantially proportional to the partial load, i.e. can be determined with a linear proportion.

According to a particularly preferred embodiment, said plant comprises a water electrolysis section and said hydrogen feed is produced by electrolysis of water. Then, the ammonia production is regulated by reducing or increasing the load of said electrolysis section, and reducing or increasing the flow rate of the nitrogen feed accordingly. According to a preferred embodiment, the nitrogen feed is generated by separation of air.

Said purge gas contains gases which are inert to the synthesis reaction. Usually a large part of said inert gases is given by Argon; in some embodiments the purge rate may also contain hydrogen and/or nitrogen, if the make-up gas contains hydrogen and/or nitrogen in excess compared to the stoichiometric rate (3:1) for conversion into ammonia ($NH_3$). The nature and amount of the inert gases may vary. For example if the hydrogen feed is produced by reforming of natural gas, the inerts found in the synthesis loop may include some unconverted methane and further gases depending on composition of the natural gas. For example in some cases the inerts may comprise a certain amount of Helium. It should be noted that the term of inerts, in this description, is referred to the synthesis of ammonia and then the "inerts" in the loop may include the known inert gases (Argon, Helium) and substances (water, methane) which do not take part to the conversion, thus being substantially "inert" relative to the synthesis of ammonia. Excess nitrogen and/or nitrogen are also considered inerts.

The main advantage of the invention is that the ammonia plant can be operated at a partial load keeping a good efficiency and protecting the reactor from overheating. The ammonia plant can follow a time-varying availability and/or price of a source feed such as electric energy and/or water in embodiments with electrolysis-based front end. This is possible even on a short-term basis, such as daily or hourly.

Referring more in detail to embodiments where the hydrogen feed comes from electrolysis of water, the ammonia plant can be operated at full nominal load (100%) when the full electric power is available and/or the energy is cheaper, and can be operated at a reduced load less than 50% when less power is available and/or price is higher. The same is applicable to availability or cost of water. This means that the electrolysis-based ammonia production becomes more attractive from an economical point of view.

Hence, electrolysis-based ammonia plant can be efficiently powered by renewable energy sources such as solar or wind. The load of the ammonia plant can be regulated in a flexible manner, for adaptation to the fluctuations of the power output provided by renewable energy sources. Hence, for example, an ammonia plant can be partly or fully powered by a solar or wind power plant, leading to a virtually carbon-free ammonia production. This option is attractive especially for small-scale ammonia production in a remote site or for agricultural use, where ammonia can be produced on-site without the need of a hydrocarbon feed.

A small-scale ammonia plant is understood as a plant with a nominal capacity of less than 50 tons per day of ammonia.

The invention can also be used to regulate the load of the ammonia plant following the price of energy, either produced with a conventional or renewable source. For example when price of energy is higher it could be preferred to turn down the ammonia plant, or to sell directly the energy whenever applicable; when the price is lower it could be preferred to use the energy for powering the electrolysis unit and hence to produce ammonia.

It has been found that by raising the concentration of inert in the loop the efficiency at partial loads remains surprisingly good. For example an ammonia plant operated at a 10% load, according to the invention, has a specific consumption of electric energy (kWh per kg of ammonia output) which is only 10-15% higher than specific consumption at nominal capacity. For a comparison, specific consumption of a conventional large ammonia plant is almost doubled when passing from nominal capacity to 50% partial load.

The same or similar advantages are achieved with different front-ends such as ATR, PDX, etc.

Other aspects of the invention are a related process and plant for the production of ammonia.

The advantages of the invention will be elucidated with the help of the following description of preferred and non-limiting embodiments.

BRIEF DESCRIPTION OF THE DRAWINGS

FIG. 1 is a block diagram showing a plant for production of ammonia with generation of hydrogen by means of electrolysis of water, according to a preferred embodiment of the invention.

DETAILED DESCRIPTION OF A PREFERRED EMBODIMENT

Referring to FIG. 1, block WE denotes a water electrolysis unit fed with water feed 2 and electric power 1. Said unit WE deliver a current 3 composed mainly of hydrogen, which is mixed with a current 4 composed mainly of nitrogen, to form a make-up gas 5.

The process of electrolysis, which takes place in the unit WE, is known and not further described. The nitrogen current 4 is preferably obtained by separation from an air flow 12, more preferably with a technique chosen between: molecular sieves; pressure swing adsorption (PSA); vacuum pressure swing adsorption (VPSA); temperature swing adsorption (TSA); a process based on membranes; a process of cryogenic separation.

The make-up gas 5 is compressed to a synthesis pressure, preferably in the range 80 to 500 bar, in a gas compressor MUC. The compressed gas 6 is sent to a synthesis loop SL operating at said synthesis pressure, and comprising at least an ammonia reactor.

The product gas of said reactor contains ammonia and a certain amount of reagents (hydrogen and nitrogen). Ammonia is separated from said product gas and the remaining reagents are recycled to the reactor via a recycle compressor RC and currents 7, 8. In some embodiments, the recycle compressor RC is replaced by an additional stage of the gas compressor MUC, namely the current 7 is sent to said additional stage of the compressor MUC and will return to the loop SL via the stream 6.

The stream 9 is the ammonia product of the synthesis loop SL.

A certain amount of inert gases, typically Argon, are contained in the hydrogen feed 3 and nitrogen feed 4. Said inerts inevitably enter the loop SL and tends to accumulate in the ammonia reactor. A purge gas flow 10 is continuously extracted from said loop SL, in order to remove said inerts and keep their concentration below a threshold which is around 10%, when the plant operates at nominal capacity. Said purge flow 10 can be regulated by a valve 11.

The electric power 1, in a preferred embodiment, is produced with a renewable energy source, preferably solar or wind energy.

The load of the ammonia plant, which means the flow rate of ammonia 9, can be reduced according to availability and/or cost of the electric power 1.

More in detail, when less electric power is available, or when the cost of electricity is higher, the production of hydrogen 3 is reduced, and the flow rate of nitrogen feed 4 is reduced accordingly, to keep the desired hydrogen to nitrogen ratio in the make-up gas 5. As a consequence, the synthesis loop SL operates at a partial load.

Under a partial load, the plant is regulated in the following manner. The delivery pressure of the compressor MUC remains the same, which means that the loop SL operates at the same elevated pressure. The flow rate of the purge gas stream 10 is reduced, in order to deliberately cause accumulation of argon and other inerts in the loop. Said accumulated inerts will keep the temperature inside the ammonia reactor within an acceptable range, protecting the ammonia reactor from overheating. The temperature in the reactor can be controlled by regulating the flow rate of the purge stream 10 via the valve 11.

In other (not shown) embodiments, the block WE is replaced by a different front-end for production of the hydrogen feed 3.

EXAMPLE

The example refers to a small ammonia according to FIG. 1 plant rated at 120 kg/h of ammonia. The following table 1 show the composition of the streams in FIG. 1 when the plant operates at nominal (7 kmol/h equal to 120 kg/h of ammonia) output. The power input, in this case, is 1300 kW which means that specific energy consumption is 1300/120=10.8 kWh per kg of ammonia.

TABLE 1

| Stream No. | 3 | 6 | 7 | 8 | 9 | 10 |
|---|---|---|---|---|---|---|
| Molar Flow (kmol/h) | 11 | 15 | 65 | 65 | 7 | 0.3 |
| mol % H2 | 100 | 74.5 | 60 | 60 | — | 60 |
| mol % N2 | — | 25 | 20 | 20 | — | 20 |
| mol % NH3 | — | — | 10 | 10 | 100 | 10 |
| mol % Ar | — | 0.5 | 10 | 10 | — | 10 |

The following table 2 refers to the same plant operated at a 10% load, which means 0.7 kmol/h or 12 kg/h of ammonia.

TABLE 2

| Stream No. | 3 | 6 | 7 | 8 | 9 | 10 |
|---|---|---|---|---|---|---|
| Molar Flow (kmol/h) | 1 | 1.5 | 25 | 25 | 0.7 | 0.01 |
| mol % H2 | 100 | 74.5 | 30 | 30 | — | 30 |
| mol % N2 | — | 25 | 10 | 10 | — | 10 |
| mol % NH3 | — | — | 10 | 10 | 100 | 10 |
| mol % Ar | — | 0.5 | 50 | 50 | — | 50 |

The hydrogen feed 3 and, hence, the make-up gas feed 6 are ten times smaller compared to table 1. To compensate for this lower feed, the molar flow rate of the purge gas (stream 10) is reduced by a factor greater than ten, from 0.3 kmol/h to 0.01 kmol/h. Using F to denote the flow rate, it can be noted that:

$F_{10}/F_6$(nominal load)=2%

$F_{10}/F_6$(partial load)=0.67% which means that, when the ammonia plant runs at 10% of its capacity according to data in table 2, said ratio $F_{10}/F_6$ (purge gas over make-up gas, molar) is around three times smaller than nominal, thus causing accumulation of argon and other inerts in the loop. The molar concentration of Argon in the loop SL, as apparent from streams 7, 8 and 10, grows from 10% to 50%.

The total electric consumption for production of hydrogen in the WE unit, and for powering the compressor MUC, is calculated as 150 kW. Taking into account the production of 12 kg/h, this corresponds to a specific consumption of 12.5 kWh/kg, which is only 15% higher than 10.8 as above.

The invention claimed is:

1. A method for regulation of an ammonia plant, said ammonia plant comprising a high-pressure ammonia synthesis loop comprising at least an ammonia reactor, where a make-up gas comprising a hydrogen feed and a nitrogen feed is converted into ammonia at a synthesis pressure;
   said loop also comprising a purge line arranged to draw a flow of a purge gas containing inerts from said loop, the method comprising the steps of:
   during operation of the ammonia plant at a partial load, operating the ammonia synthesis loop at said synthesis pressure, and reducing said purge flow to obtain a concentration of inerts in the ammonia synthesis loop which is greater than a concentration of inerts in the loop at nominal load;
   wherein the ammonia plant is operated at nominal load and at partial load, alternately; and
   wherein during operation of the ammonia plant at a partial load, the ratio between the molar flow rate of said purge gas and the molar flow rate of make-up gas is reduced to a value which is smaller than a nominal value of said ratio used when the ammonia plant operates at a nominal load.

2. The method according to claim 1, wherein said ratio between the molar flow rates of purge gas and make-up gas is adjustable until a minimum value which is 50% or less of said nominal value.

3. The method according to claim 2, wherein said minimum value is two to four times smaller than said nominal value.

4. The method according to claim 2, wherein said minimum value of the ratio between the molar flow rates of purge gas and make-up gas is adopted for a partial load which is equal to or less than 20% of the nominal load.

5. The method according to claim 4, wherein said partial load is in the range 10% to 20% of the nominal load.

6. The method according to claim 1, wherein the flow rate of said purge gas is reduced until the concentration (volume) of inerts in the synthesis loop reaches 40%-70%.

7. The method according to claim 6, wherein the flow rate of said purge gas is reduced until the concentration (volume) of inerts in the synthesis loop reaches around 50%.

8. The method according to claim 1, wherein said flow rate of purge gas is regulated by means of a valve disposed for controlling the flow through said purge line of the loop.

9. The method according to claim 1, wherein:
   said plant comprises a water electrolysis section (WE) and said hydrogen feed is produced by electrolysis of water, and
   the ammonia production is regulated by reducing or increasing the load of said electrolysis section (WE), and reducing or increasing the flow rate of said nitrogen feed accordingly.

* * * * *